United States Patent
Dubin

[11] Patent Number: 5,984,337
[45] Date of Patent: Nov. 16, 1999

[54] MOTORCYCLE ERECTOR DEVICE

[76] Inventor: Sol Dubin, 4074 Wilshire Dr., York, Pa. 17402

[21] Appl. No.: 09/058,452

[22] Filed: Apr. 10, 1998

[51] Int. Cl.$^6$ ........................................ B62H 1/00
[52] U.S. Cl. .............................. 280/293; 414/678
[58] Field of Search ...................... 280/293, 201, 280/762, 763.1; 414/678; 52/2.11, 2.17, 2.18, 2.24, 2.25

[56]  References Cited

U.S. PATENT DOCUMENTS

| | | | |
|---|---|---|---|
| 4,034,872 | 7/1977 | Jager | 214/86 A |
| 4,494,764 | 1/1985 | Kelley | 280/293 |
| 4,650,213 | 3/1987 | Fujita et al. | 280/772 |
| 4,681,299 | 7/1987 | Siebert | 254/8 R |
| 4,847,925 | 7/1989 | Perry | 4/499 |
| 4,974,829 | 12/1990 | Gamow et al. | 272/3 |
| 5,122,400 | 6/1992 | Stewart | 428/34.7 |
| 5,178,367 | 1/1993 | Vaughen | 254/93 HP |
| 5,543,194 | 8/1996 | Rudy | 428/69 |
| 5,564,735 | 10/1996 | Boy et al. | 280/730.2 |
| 5,579,609 | 12/1996 | Sallee | 52/2.11 |
| 5,588,639 | 12/1996 | Holman | 254/133 R |
| 5,590,000 | 12/1996 | Hopf et al. | 360/96.5 |
| 5,601,277 | 2/1997 | Larson | 254/131 |
| 5,636,835 | 6/1997 | Schindler et al. | 473/605 |
| 5,642,750 | 7/1997 | Brown et al. | 135/137 |
| 5,649,701 | 7/1997 | Mills et al. | 273/58 BA |
| 5,660,197 | 8/1997 | Boe et al. | 135/116 |

*Primary Examiner*—Lanna Mai
*Assistant Examiner*—Michael Cuff

[57] ABSTRACT

A motorcycle erector device that erects a motorcycle lying on its side and does not require the operator-driver to exert any lifting effort. The motorcycle erector device is self-contained, self-powered and is carried on a motorcycle as part of the motorcycle's baggage without degrading the ride characteristics or control dynamics of the motorcycle. Lightweight, small size it is packed into small duffel that is quickly lashed to the motorcycle at any convenient location. It will not mar the finish of the motorcycle or damage the motorcycle when used to erect the motorcycle lying on its side. No modifications to the motorcycle are required. The motorcycle erector device forms a stable 3-point configuration during and subsequent to the erecting process. After use it is repacked into the small duffel.

3 Claims, 8 Drawing Sheets

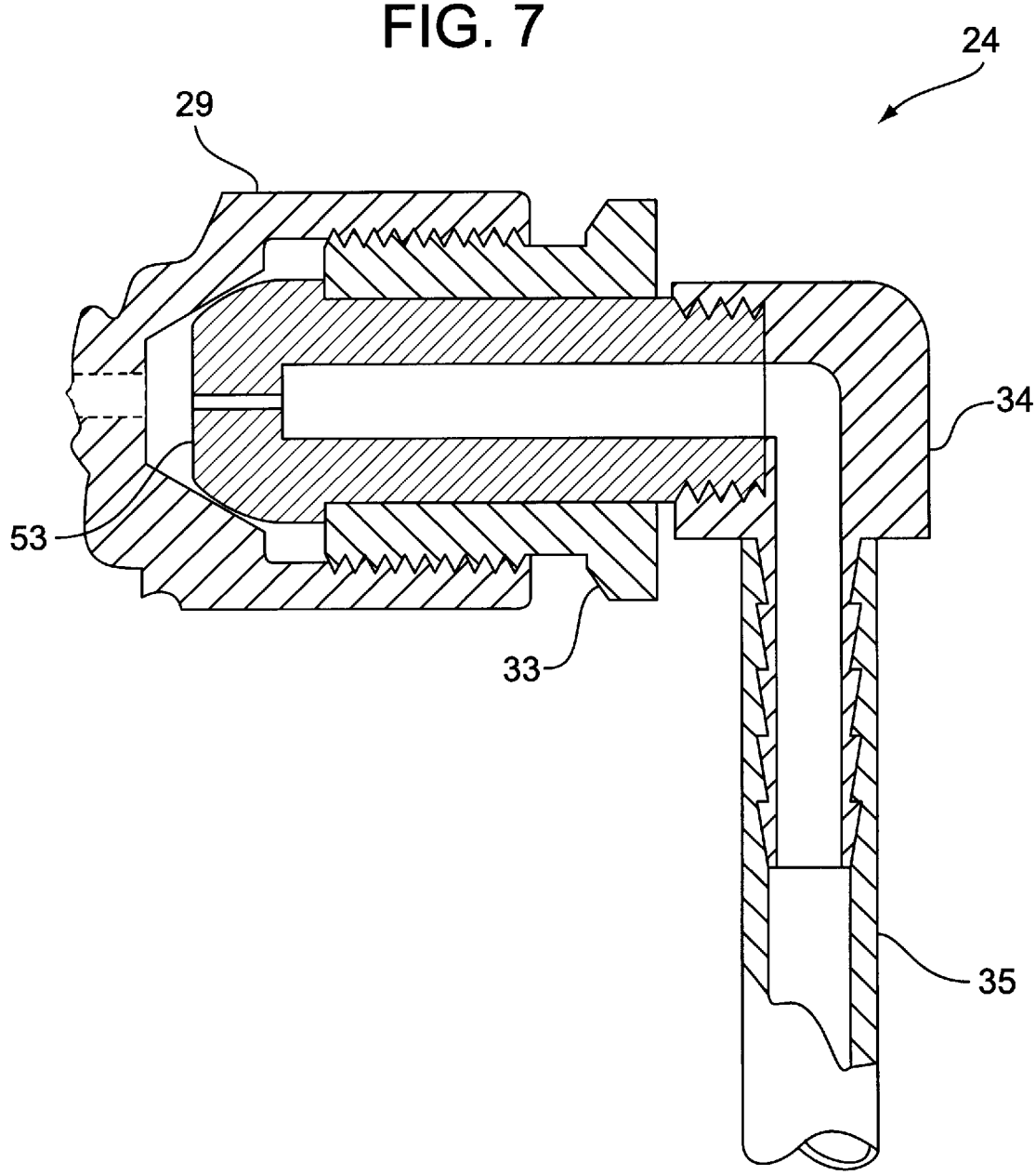

MOTORCYCLE ERECTOR DEVICE

BACKGROUND OF THE INVENTION

1. Field of Invention

This invention relates in general to devices for erecting a motorcycle lying on its side and in particular to small, light-weight, self-powered and self-contained portable erecting devices carried, at the option of the operator-driver, as part of the baggage on the motorcycle.

2. Prior Art

Generally, operator-drivers of motorcycles who lack the physical strength to erect a motorcycle lying on its side or, fearful of injury to themselves, choose not to attempt to erect a motorcycle lying on its side. They must wait for help from 'Good Samaritan' passers-by or obtain assistance, if possible, from a commercial road service.

Other devices for lifting, jacking, hoisting or leveling motorcycles are known, for example:

"Jacking system for two wheeled vehicles" by Larson U.S. Pat. No. 5,601,277

"Motorcycle jack" by Siebert U.S. Pat. No. 4,681,299

"Motorcycle lift and method" by Kelley U.S. Pat. No. 4,494,764

"Lifting device" by Wilcox U.S. Pat. No. 5,590,000.

"Structure for an inflatable lift device" by Vaughen U.S. Pat. No. 5,178,367

"Motorcycle rack for a tow truck" by Jager U.S. Pat. No. 4,034,872

"One man lift for motorcycles" by Holman U.S. Pat. No. 5,588,639

"Vehicle body inclining apparatus of vehicle" by Fujita U.S. Pat. No. 4,650,213

"Inflatable ball" by Shindler U.S. Pat. No. 5,636,835

"Side mounted airbag device" by Boy U.S. Pat. No. 5,564,735

"Sports ball and method of manufacturing of same" by Mills U.S. Pat. No. 5,649,701

"Pressurizable envelope and method" by Rudy U.S. Pat. No. 5,543,194

"Inflatable articles and method of creating inflatable articles" by Stewart U.S. Pat. No. 5,122,400

However, no device is known that can be carried on a motorcycle as part of the baggage load, will not degrade riding characteristics and control dynamics of the motorcycle, and can be used to erect a motorcycle when lying on its side.

SUMMARY OF THE INVENTION

Motorcycles are two-wheel in-line vehicles and, when stopped, have static instability. The operator-driver of a motorcycle, astride the stopped vehicle, uses legs and feet to stabilize the vehicle in a vertical attitude or, for parking, deploys the side-stand, shuts-off the engine and leans the vehicle on the side stand. The motorcycle will rest at the angle to the vertical defined by the geometry of the deployed side-stand and the road surface. This angle, referred to as the side-stand angle, can vary by reason of road surface contour and local deformation of the road surface by the side-stand end in contact with the road surface.

Starting the motorcycle from the parked position, the operator-driver mounts astride the motorcycle, erects the motorcycle to vertical, stabilizes the motorcycle with legs and feet, retracts the side-stand, starts the engine, coordinates clutch, gear selection, throttle and accelerates to desired speed. A motorcycle in motion normally has dynamic stability; however, due to road conditions, motorcycle attitude or misadventure, the motorcycle in motion may also acquire dynamic instability and fall on its side.

Motorcycles have grown in size and weight to a degree that operator-drivers of these vehicles risk injury to themselves and additional damage to their motorcycles by attempting to erect the vehicles without assistance. Subsequent to an accident resulting in the motorcycle lying on its side, the operator-driver may be injured, alone or on a dark, lightly traveled road, and may not receive urgent or timely assistance for erecting the motorcycle.

The invention described herein, when carried on the motorcycle as part of the motorcycle's baggage, will not degrade the motorcycle's ride characteristics and control dynamics. And, when off-loaded, deployed and activated by the operator-driver, will erect the motorcycle lying on its side to the side stand angle without injury to the operator-driver and without damage to the moyorcycle.

The principal object of the present invention is to provide a device for erecting a motorcycle lying on its side.

It is also an object of the present invention to provide a device for erecting a motorcycle lying on its side that is light-weight and small in size and can be safely carried as part of the baggage load of the motorcycle.

Another object of the present invention is to provide a device for erecting a motorcycle lying on its side, without requiring the operator-driver to exert any of the force required to erect the motorcycle, thereby, forestalling any possibility of self-imposed strain or injury.

Another object of the present invention is to provide a device to erect a motorcycle lying on its side and stabilizing it during and subsequent to the erection of the motorcycle.

A further object of the present invention is to provide a device for erecting a motorcycle lying on its side and when carried as part of the baggage load of the motorcycle during operational use, will not adversely affect the ride characteristics and control dynamics of the motorcycle.

Another object of the present invention is to provide a self-powered device for erecting a motorcycle lying on its side without requiring the use of the motorcycle's systems as a source of operating power.

Another object of the present invention is to provide a device for erecting a motorcycle lying on its side whose component parts, assemblies and consumable are replaceable as service items, including the power for actuating the motorcycle erector device.

A further object of the present invention is to provide a device for erecting a motorcycle lying on its side without causing damage to the motorcycle the device having a soft, smooth and compliant surface where it is in contact with the motorcycle during erecting operations.

An additional object of the present invention is to provide a device for erecting a motorcycle lying on its side without requiring any modifications to the motorcycle.

The foregoing objects are accomplished, in the preferred embodiment of the invention, by providing a motorcycle erector device packed in a small duffel. The motorcycle erector device comprises a retaining link with deformable coating, a self-contained power source of high-pressure non-inflammable gas stored in a tank with a manual-operating tank valve, a pressure reducing gas-metering nipple assembly installed in the tank valve, a flexible tubing gas-transfer assembly with quick-disconnect fitting and an erecting spheroid assembly.

The erecting spheroid assembly comprising a flexible spheroid enclosure, a retention point woven fabric loop, an access and service opening with closure means and an opening for the installation of a gas feed threaded fitting. Further comprising a pressure forming, gas-impermeable liner with installation opening for a gas feed threaded fitting, a gas feed threaded fitting with seals, washers and an assembly nut.

The operating power source of high-pressure non-inflammable gas is stored in a tank fitted with a tank valve having a manual-operating handle. The tank valve is further comprised of a pressure reducing gas metering nipple assembly providing low pressure non-inflammable gas through a gas metering orifice in the metering nipple for activation of the motorcycle erector device. The quantity of low-pressure gas required to operate the motorcycle erector device is stored in the tank at a high pressure commensurate with the size, or internal volume, of the tank. This arrangement obviates the need for a complex, and expensive, adjustable diaphragm type of pressure-reducing device, requiring a pressure-reading gauge to set the operating pressure. During activation of the motorcycle erector device the low-pressure gas is conveyed to the erecting spheroid assembly by means of a flexible tubing gas-transfer assembly.

The flexible spheroid enclosure comprises and encompasses a pressure forming gas-impermeable liner; installed gas feed fitting and flexible seals sealing the gas feed fitting to the pressure forming gas-impermeable liner. Rigid washers provide support for the seals. The flexible spheroid further comprising an assembly nut, torqued to insure a gas leak-proof sealing of the pressure forming, gas-impermeable liner to the gas feed fitting, and a retention point woven fabric loop for engaging the retaining link.

The flexible tubing gas-transfer assembly comprised of a plurality of flexible tubing connected by a quick-disconnect fitting with integrated flexible tubing barbed connectors. At one end of the flexible tubing gas-transfer assembly is an installed threaded connector fitting with an integrated flexible tubing barbed connector. The threaded end of the threaded connector fitting is connected to the gas feed fitting. The other end of the flexible tubing gas-transfer assembly connects to the integrated flexible tubing barbed connector of the pressure reducing gas-metering nipple assembly. The plurality of flexible tubing is of sufficient length to allow the operator-driver to carry the quick-disconnect fitting in hand when mounting astride the motorcycle after the motorcycle is erected.

Also provided is a retaining link, having a deformable coating, configured on one end with an open hook and on the other end with an open eye. The open eye allows the engagement of the retention point woven fabric loop with the eye-end.

To deploy the motorcycle erector device the components are removed from the small duffel. The retaining link eye-end and the retention point woven fabric loop are engaged. The retaining link hook-end is pushed under the motorcycle, directed first under the fuel tank, then under the engine, until the hook-end appears on the other side of the motorcycle lying on its side. The operator-driver grasps the now visible hook-end and engages the motorcycle structure. The erector spheroid assembly is at this point mechanically connected to the structure of the motorcycle and properly deployed to effect the erecting of the vehicle.

To erect the vehicle the operator-driver opens the tank valve. The pressurized gas is released through the pressure reducing gas-metering nipple assembly and is conveyed by the flexible tubing gas-transfer assembly into the pressure forming gas-impermeable liner of the erector spheroid assembly. The erector spheroid assembly expands to its spheroid shape as the pressure forming gas-impermeable liner fills with the low-pressure metered gas and erects the motorcycle. When the flow of gas stops, the motorcycle is at the side-stand angle erected position. The operator-driver takes the quick-disconnect fitting in hand and mounts astride the motorcycle. The plurality of flexible tubing is of sufficient length to enable the operator-driver to accomplish the mount. The mounted operator-driver erects the vehicle to vertical position while stabilizing the vehicle with legs and feet—the normal vehicle-stopped configuration. The operator-driver opens the quick-disconnect fitting, depressurizing the erector spheroid assembly, deploys the side-stand and leans the motorcycle so that the deployed side-stand contacts the road surface. The operator-driver dismounts, disengages the retaining link hook-end from the motorcycle structure and repacks the motorcycle erector device into the small duffel.

BRIEF DESCRIPTION OF THE DRAWINGS.

For a more complete understanding of the present invention and the advantages thereof, reference is now made to the following Description, taken in conjunction with the accompanying Drawings in which:

FIG. 7 is an enlarged cross-section of the pressure reducing gas-metering nipple assembly shown installed in the broken away internally threaded section of the tank valve. For clarity purposes, the metal-to-metal seal normally made between the tank valve and pressure reducing nipple assembly is shown with the seal surfaces separated.

DETAILED DESCRIPTION

Figure 1:
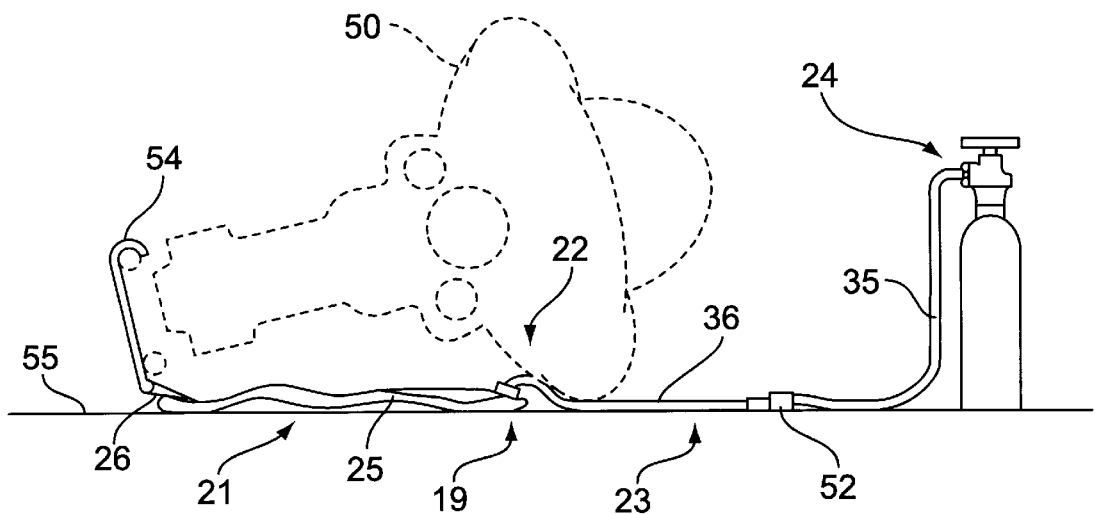
FIG. 1 is a pictorial elevation view of the motorcycle erector device of the present invention for erecting a motorcycle lying on its side, deployed in the preactivated mode; with retaining link eye-end connected to the retention point woven fabric loop. The retaining link hook-end hooked to a structural member of the motorcycle lying on its side.

The preferred embodiment of the motorcycle erector device 19 is shown in FIG. 1 in the deployed but inactivated mode. In this deployed mode the said motorcycle erector device 19 and its comprised elements are assembled and interconnected. The retention point woven fabric loop 26 of the erecting spheroid assembly 21 has been attached to the retaining link 54 and said retaining link 54 has engaged a structural element of the motorcycle 50.

To activate the said motorcycle device 19 and erect the said motorcycle 50 the operator-driver opens the tank valve 29 with the manual-operating handle 30. This releases the high pressure non-inflammable gas 56 stored in the high pressure storage tank 31 and activates said motorcycle erector device 19.

Figure 2:
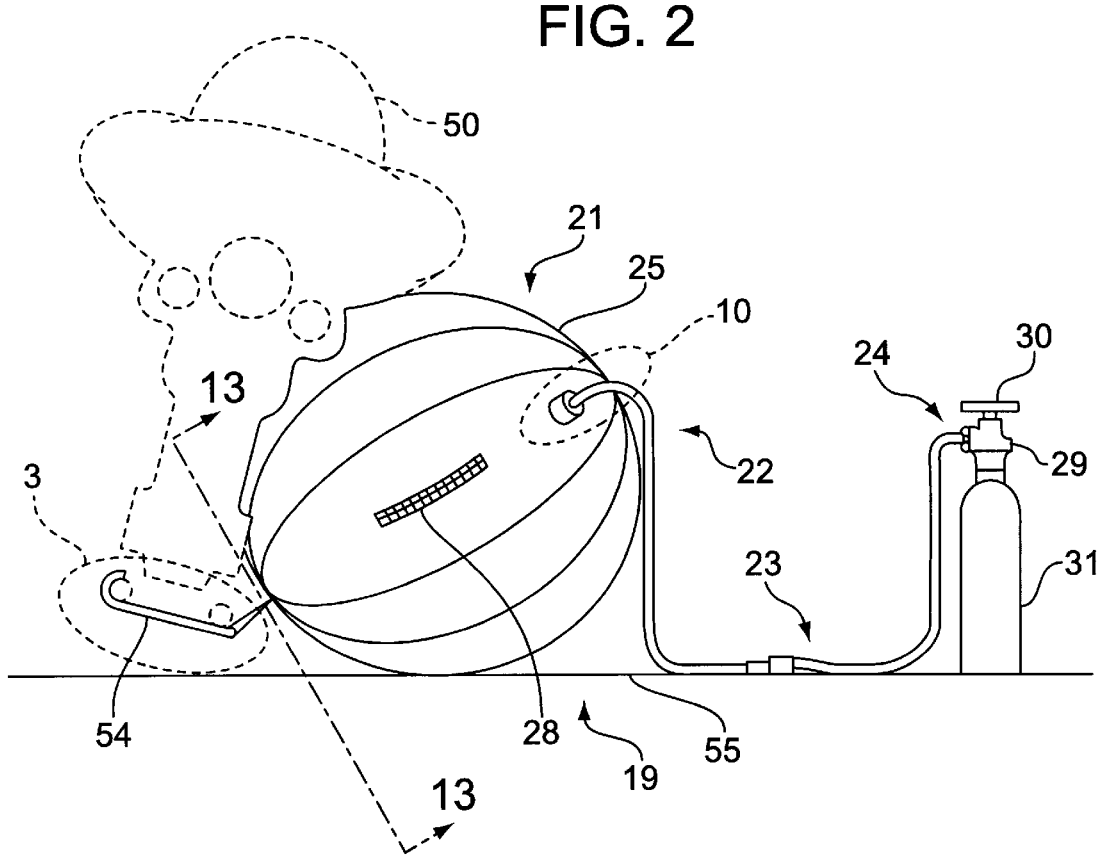
FIG. 2 is a pictorial elevation view of the device of FIG. 1 in the activated mode subsequent to the erecting of the motorcycle to the side stand angle.

In FIG. 2, the activated said motorcycle erector device 19 is shown supporting the said motorcycle 50 erected to the side-stand angle. And, further illustrates the function of the said retaining link 54 in maintaining the said erecting spheroid assembly 21 in the proper position for erecting the said motorcycle 50 to the side-stand angle.

The said motorcycle erector device 19 for erecting a motorcycle lying on its side comprising said erecting spheroid assembly 21, a flexible spheroid enclosure 25, a pressure forming gas-impermeable liner 20, said retaining link 54, flexible tubing gas-transfer assembly 23, a pressure reducing gas-metering nipple assembly 24, said tank valve 29, said manual operating handle 30, said high-pressure gas storage tank 31 filled with said high-pressure non-inflammable gas 56 and a seal 32.

The said motorcycle erector device 19 weighs less than 7 pounds and is packed into a small duffel 15.5 inches long and 6.5 inches diameter. Said motorcycle erector device 19 is transportable as part of the baggage load of said motorcycle 50 without adversely affecting the ride characteristics and control dynamics of said motorcycle.

The erecting spheroid assembly 21 comprising a flexible spheroid enclosure 25 comprising a number of shaped gores of soft, flexible, woven fabric having a means of assembly. The said soft, flexible, woven fabric of said flexible spheroid enclosure 25 will not damage said motorcycle 50 when in contact with said motorcycle 50.

Figure 10:
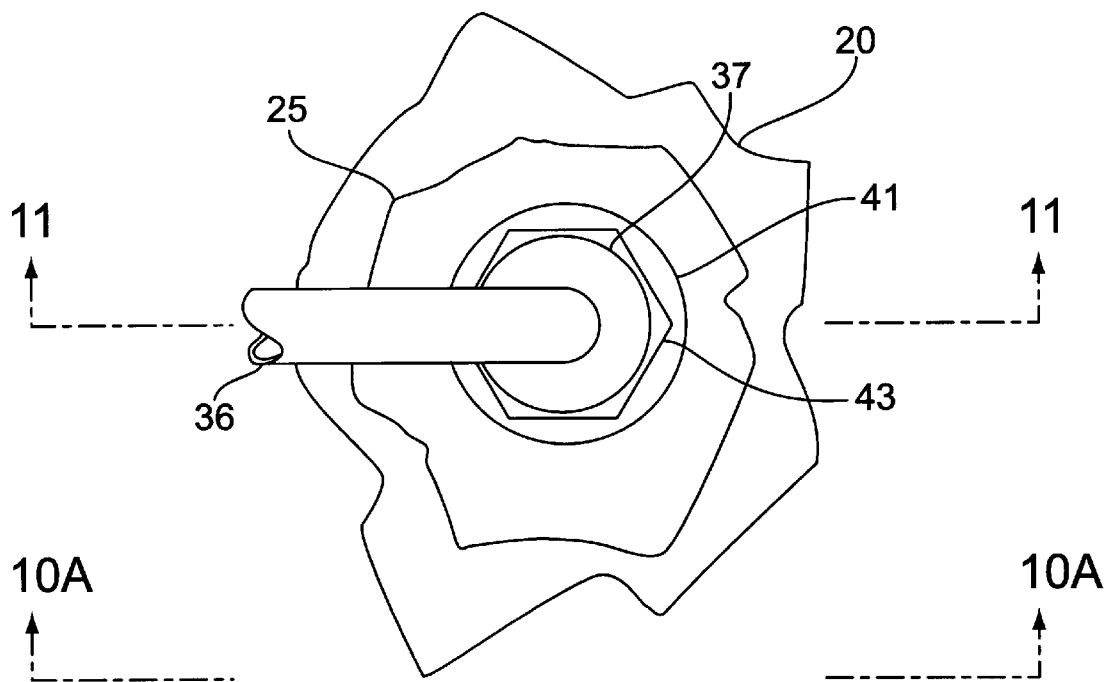
FIG. 10 is the top elevation of the installed gas feed fitting with flexible tubing attached and the pressure forming gas-impermeable liner, the flexible spheroid enclosure and the attached flexible tubing broken away. Also visible are the assembly nut, threaded connector fitting and rigid washer. Additionally displayed is the cross-section location for FIG. 11.
Figure 10A:
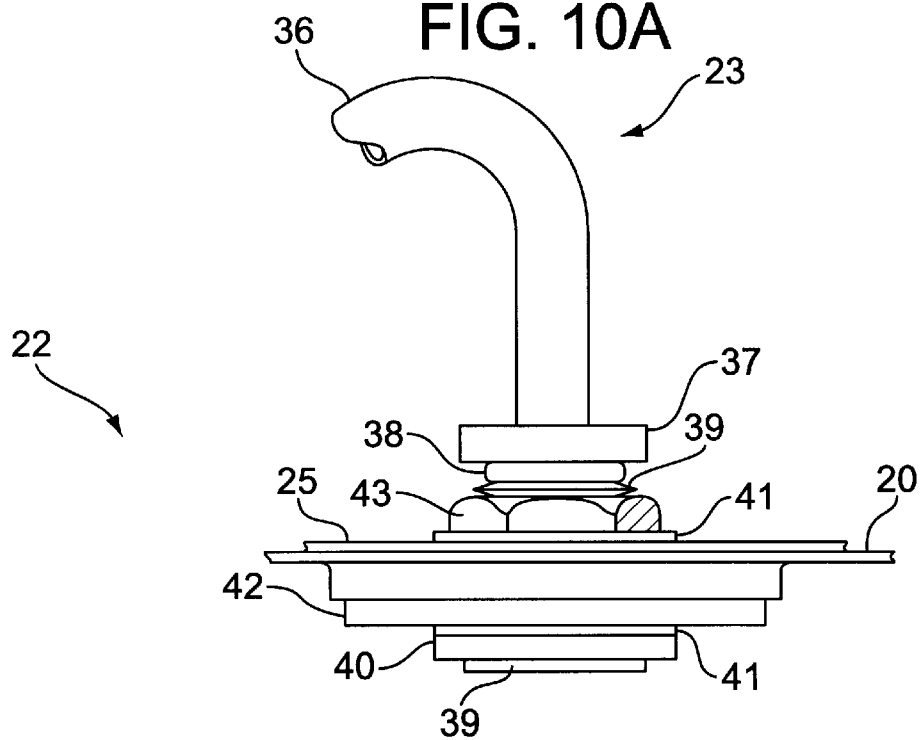
FIG. 10A is the front elevation view of the assembly of the gas feed fitting of FIG. 10 with associated seals, associated rigid washers, pressure forming gas-impermeable liner and flexible spheroid enclosure. Also displayed are the threaded connector fitting and seal connected to the gas feed fitting with flexible tubing broken away. The depiction of the pressure forming gas-impermeable liner is: under internal pressure, forming over a seal and rigid washer and in intimate contact with the flexible spheroid enclosure
Figure 11:
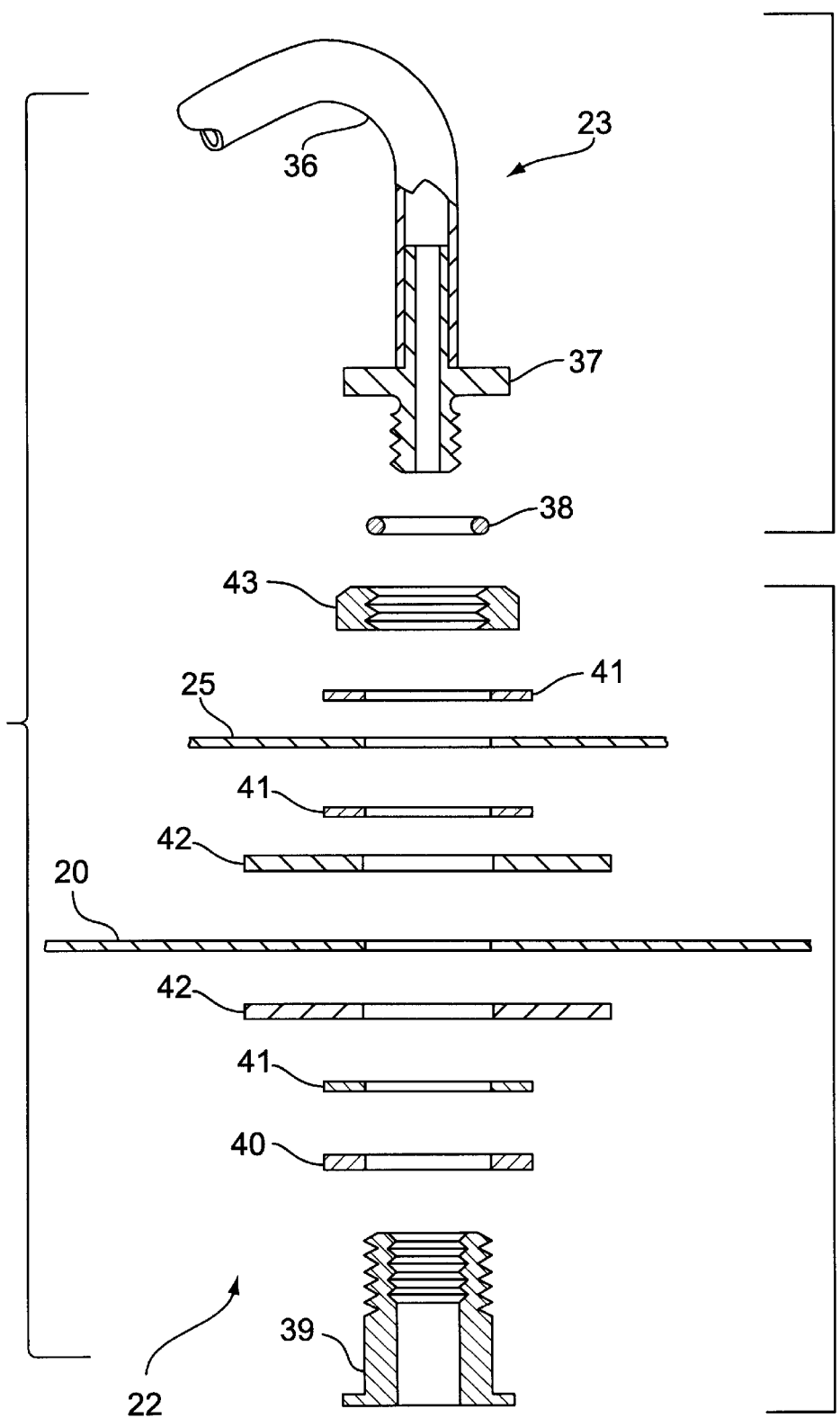
FIG. 11 is the exploded cross-section view of FIG. 10 and displays the assembly of the gas feed fitting and contiguous component parts and assemblies. For purposes of clarity, the pressure forming gas-impermeable liner is not shown formed under pressure. The integrated flexible tubing barbed connector of the threaded connector is connected to the flexible tubing partially broken away.

The FIG. 10, FIG. 10A and FIG. 11 show said flexible spheroid enclosure 25 comprising a close-fitting opening for the insertion of the non-flanged stem-end of the gas feed fitting 39 and FIG. 2 shows the access and service opening with means of opening and closing by interlocking tension-load carrying links 28. Said access and service opening providing a means for the insertion and removal of the said pressure forming gas-impermeable liner 20. The said pressure forming gas-impermeable liner 20 comprised of a plurality of plastic sheet film, heat-seamed to form a partially closed said pressure forming gas-impermeable liner 20 and additionally provided, as shown in FIG. 11, with a close-fitting opening for insertion of the non-flanged stem-end of said gas feed fitting. 39.

Figure 13:
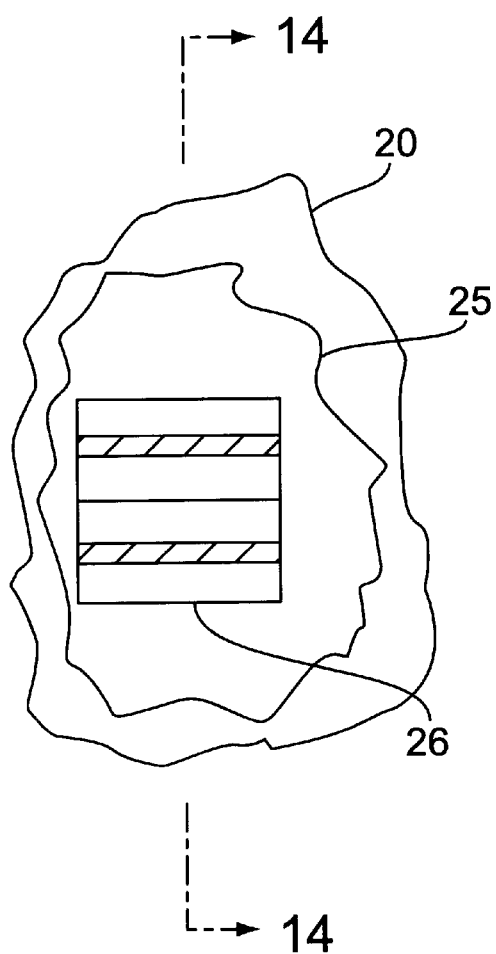
FIG. 13 is the cross-section view of the retention point woven fabric loop, attached to the broken away flexible spheroid enclosure. The pressure forming gas-impermeable liner is also shown broken away.
Figure 14:
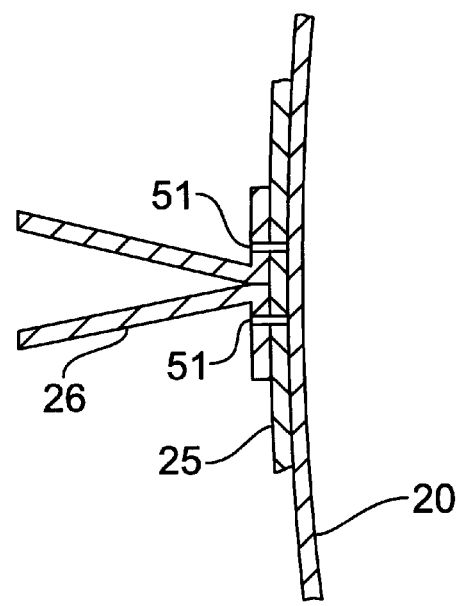
FIG. 14 is the indicated cross-section view of the FIG. 13 depiction of the retention point woven fabric loop and displays the turned fabric flanges which are attached to the flexible spheroid enclosure with means of assembly.

As shown in FIG. 13 and FIG. 14, the said flexible spheroid enclosure 25 is further comprised of, in this preferred embodiment, a retention point woven fabric loop 26 with means of attachment 51 to said flexible spheroid enclosure 25.

The non-flanged stem-end of said gas feed fitting 39, fitted with a flexible seal 40, a rigid washer 41, a flexible seal 42, is inserted through said close-fitting opening in the said partially heat-seamed said pressure forming gas-impermeable liner 20. The said non-flanged stem-end of said gas feed fitting 39 is inserted, in direction, from inside-to-outside of said partially heat-seamed said pressure forming gas impermeable liner 20. The said non-flanged stem-end of said gas feed fitting 39 projecting through said close-fitting opening, is fitted with a flexible seal 42 and a rigid washer 41. Complete closure heat seaming of said pressure forming gas-impermeable liner 20 is effected.

The said gas feed fitting 39, said pressure forming gas-impermeable liner 20, said seal 40, said seals 42 and said rigid washers 41 are inserted through said access and service opening in said flexible spheroid enclosure 25. The said non-flanged stem-end of said gas feed fitting 39 is inserted through—inside to outside—the said close fitting opening in said flexible spheroid enclosure 25. The projecting portion of said non-flanged stem-end of said gas feed fitting 39 is fitted with a rigid washer 41 and an assembly nut 43, torqued to insure a gas leak-proof assembly installation. The said access and service opening is closed with the interlocking tension-load-carrying links 28. Filled with low-pressure, non-inflammable gas 56, the said pressure forming gas-impermeable liner 20 is formed into intimate contact with the interior surface of the said flexible spheroid enclosure 25.

As best seen in FIG. 10A and FIG. 11, the non-flanged internally and externally threaded end of said gas feed fitting 39 projects from said erecting spheroid assembly 21. Said gas feed fitting 39 is connected to the external threaded end of the said threaded connector fitting with integrated flexible tubing barbed connector 37 and installed said seal 38 of said flexible tubing gas-transfer assembly 23.

The said flexible tubing gas-transfer assembly 23 comprising a plurality of flexible tubing connected to a quick-disconnect fitting with integrated flexible tubing barbed connectors 52 located within the plurality of flexible tubing. Said plurality of flexible tubing is of sufficient length to permit the operator-driver to hold said quick-disconnect fitting with integrated flexible tubing barbed connectors 52 in hand, and mount astride the erected said motorcycle 50. The said threaded connector fitting with integrated flexible tubing barbed connector 37, is connected to one end of said flexible tubing gas-transfer assembly 23. At the opposite end of said flexible tubing gas-transfer assembly 23, is a connection to a pressure reducing gas-metering nipple assembly with integrated flexible tubing barbed connector 24.

Figure 12:
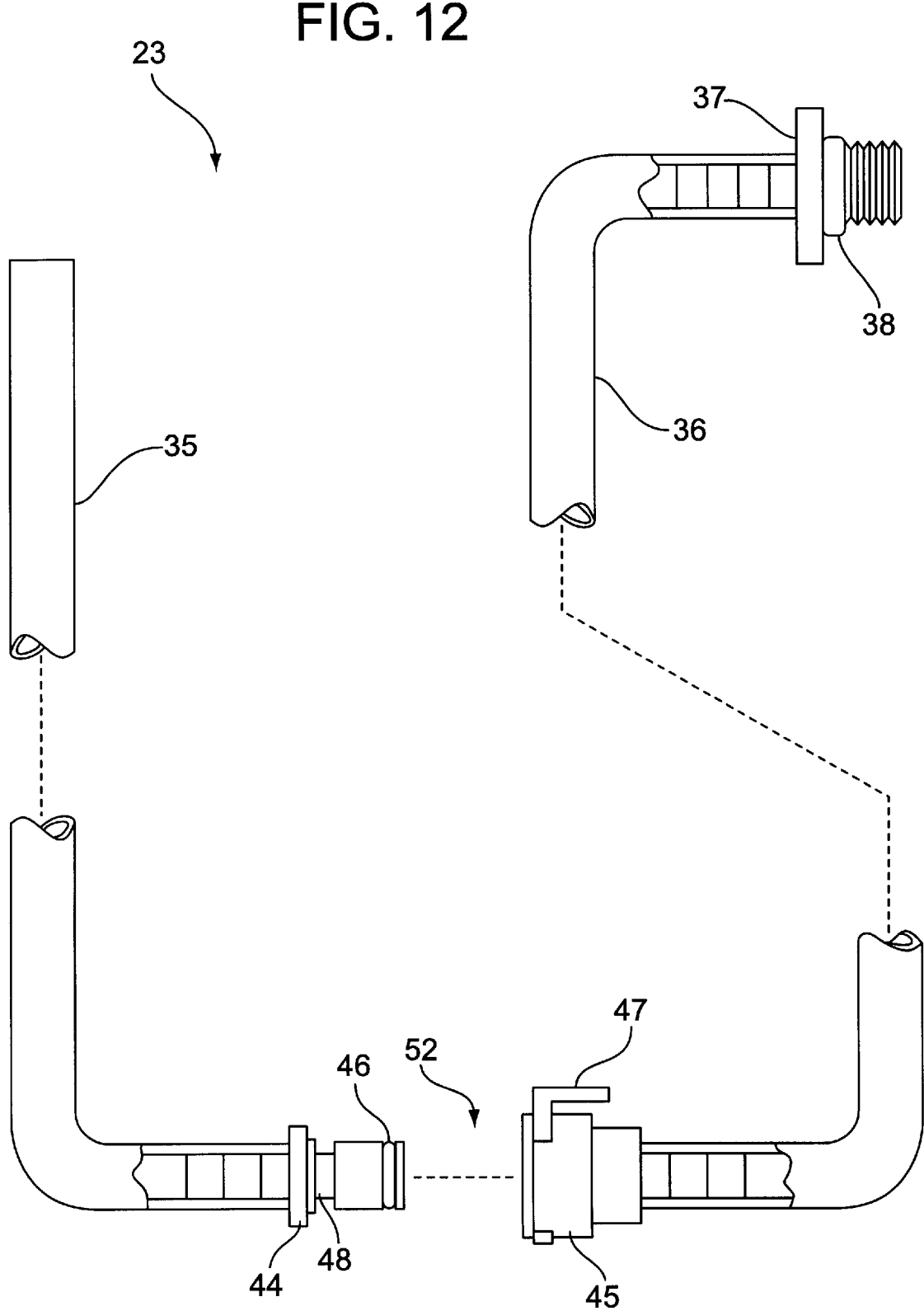
FIG. 12 is a front elevation view of the gas-transfer flexible tubing assembly, partially broken away to display connection methods of flexible tubing to constituent parts of the gas-transfer tubing assembly, and to display features of the quick-disconnect fitting.

The said flexible tubing gas-transfer assembly 23, as shown in FIG. 12, comprising said threaded connector fitting with integrated flexible tubing barbed fitting 37 connected to one end of a length of flexible tubing 36. Connected, at the other end of the said length of said flexible tubing 36, to the integrated flexible tubing barbed connector end of the female locking half 45 of the said quick-disconnect fitting 52.

The said flexible tubing gas-transfer assembly 23 comprising another length of flexible tubing 35 connected at one end to the integrated flexible tubing barbed connector of the male sealing half 44 of the said quick disconnect fitting 52. At the other end, connected to the integrated flexible tubing barbed connector of said pressure reducing gas-metering nipple assembly 24. The said quick disconnect fitting 52 further comprising the features of spring locking lever 47, seal 46 and lock groove 48 required for reliable deployment and operation of the said motorcycle erector device 19.

As displayed in FIG. 7 the said pressure reducing gas-metering nipple assembly with integrated flexible tubing barbed connector 24 comprising a gas metering nipple sleeve with gas metering orifice 53 and a captive nut 33. Said captive nut 33 is captured between the head of the said gas-metering nipple sleeve with gas metering orifice 53 and the shoulder of the attached elbow fitting with integrated flexible tubing barbed connector 34.

Also, as shown in FIG. 7, the said pressure reducing gas-metering nipple assembly with integrated flexible tubing barbed connector 24 is retained in the body of the said tank valve 29 by the said captive nut 33. Said tank valve 29 further comprising a threaded stem, an internally threaded gas connection port with internal seal-face configuration and manual operating handle 30. The head of said gas-metering nipple sleeve 53 forming a metal-to-metal gas-tight seal against the said internal seal-face configuration of the said tank valve 29. Said head of said gas-metering nipple sleeve 53 is driven by the said captive nut 33 in engagement with the internal thread of the said internally threaded gas connection port of said tank valve 29.

For purposes of clarity, in FIG.7 the head contour of the said gas-metering nipple sleeve 53 is shown not in contact with the internal seal-face configuration of the said tank valve 29.

Figure 5:
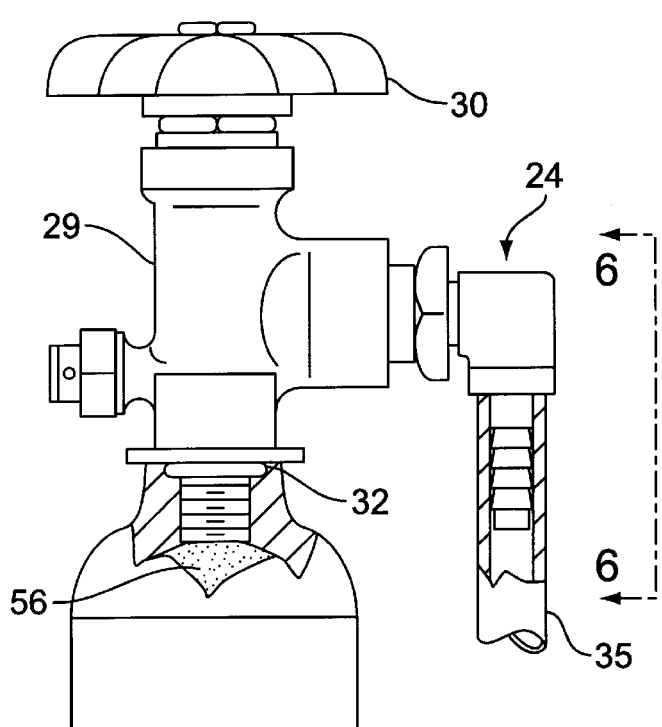
FIG. 5 is the front elevation of the tank with the neck broken away; displayed are the tank valve, threaded stem of the tank valve and seal installed in the threaded neck of the tank, high pressure gas, tank valve manual-operating handle and pressure reducing gas metering nipple assembly. The pressure reducing gas metering nipple assembly is displayed with attached flexible tubing partially broken away to display the flexible tubing barbed connector.
Figure 6:
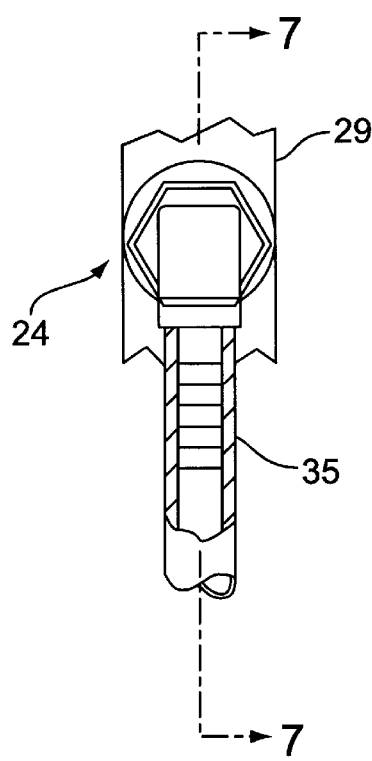
FIG. 6 is the side elevation of FIG. 5 restricted to a reduced section of the tank valve with view boundaries broken away and pressure reducing, gas-metering nipple assembly with flexible tubing partially broken away.

As shown in FIG. 5, the said threaded stem of said tank valve 29, fitted with a seal 32 is installed into the threaded opening of the high-pressure gas storage tank 31 and said high-pressure gas storage tank 31 is filled with high-pressure non-inflammable gas 56.

Figure 9:
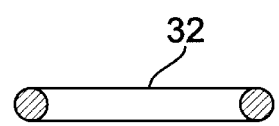
FIG. 9 is the cross-section view of the seal of FIG. 8.
Figure 8:
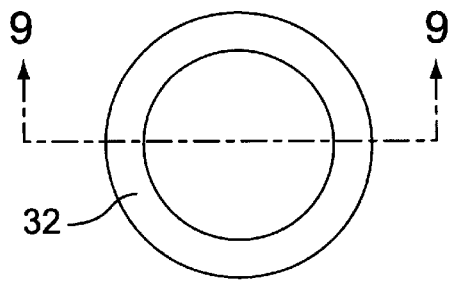
FIG. 8 is the top elevation view of the tank valve-to-tank seal also indicating the location of the cross-section depicted in FIG. 9.

As shown in FIG. 5, the comprised arrangement of said high-pressure gas storage tank 31, filled with said high-pressure non-inflammable gas 56, is controlled with the installed said tank valve 29. The said tank valve 29 is fitted with, as shown in FIG. 8 and FIG. 9, said seal 32 and said manual-operating handle 30 and said pressure reducing gas-metering nipple assembly 24. This comprised arrangement is the self-contained operating power source for activation and use of the motorcycle erecting device 19. The operator-driver does not exert any erecting forces to erect, to the side-stand angle, said motorcycle 50 lying on its side; the operator-driver does not use any power sources of said motorcycle 50 to erect, to the side-stand angle, the said motorcycle 50 lying on its side.

Figure 3:
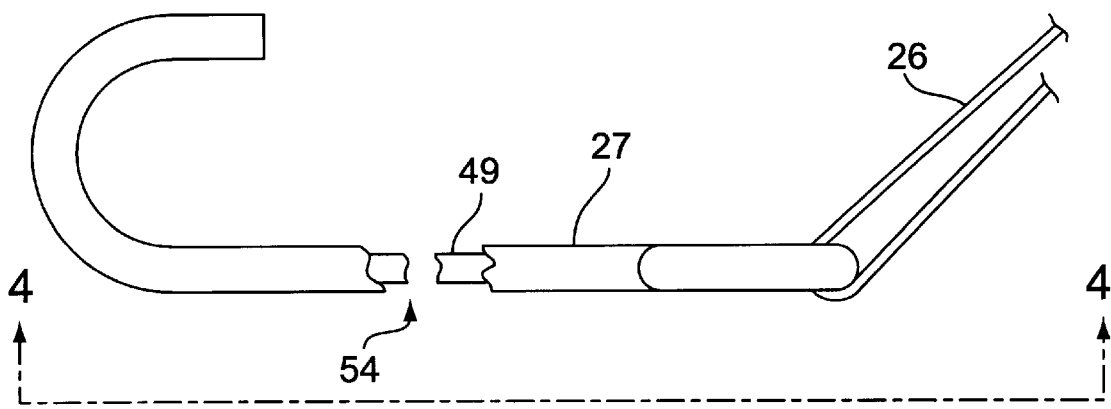
FIG. 3 is an enlarged side elevation of the retaining link, broken away to display rod and coating and engaged with a broken away part of the retention point woven fabric loop.
Figure 4:
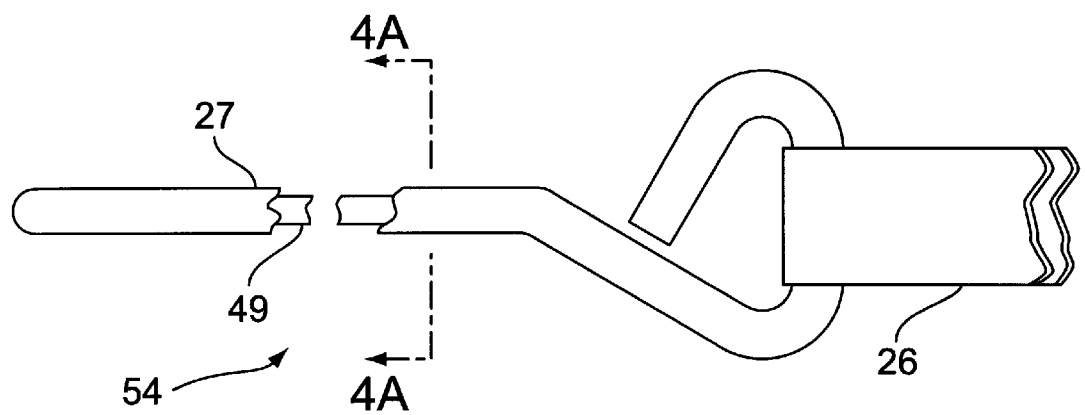
FIG. 4 is the top elevation of the retaining link of FIG. 3 with typical cross-section location indicated.
Figure 4A:
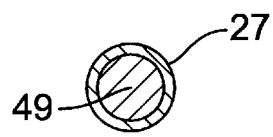
FIG. 4A is the typical cross-section of the retaining link of FIG. 4.

As shown in FIG. 3 and FIG. 4A, the said retaining link 54, comprising a rod 49 coated with a layer of deformable plastic material 27, will not mar the finish of the structural element of said motorcycle 50 engaged by said retaining link 54. Said retaining link 54, in this preferred embodiment, is formed with an open hook at one end and an eye at the other end. As shown in FIG. 4, said eye-end is formed so that it provides a means of accepting and retaining said retention point woven fabric loop 26. The plane of the said hook-end is perpendicular to the plane of the said eye-end. Said eye-end of the said retaining link 54 connects to and retains the said retention point woven fabric loop 26.

The perpendicular angular relationship between said ends of said retaining link 54 enables dual support points, as shown in FIG. 2 and FIG. 4, for said eye-end configuration of the said retaining link 54 against the structure of the said motorcycle 50. Additionally, the perpendicular relationship of the said hook-end to said eye-end of said retaining link 54, facilitates placing the said retaining link 54 between the side of the said motorcycle 50 and the road surface 55 during deployment of the said motorcycle erecting device 19. The hook-end plane of said retaining link 54 is oriented parallel to the said road surface 55 and directed by the operator-driver between the said side of said motorcycle 50 and said road surface 55. The operator-driver can conveniently hold the vertically oriented eye-end of said retaining link 54 and guide the placement of said hook-end.

The foregoing portion of the DETAILED DESCRIPTION describes the comprising elements, specifications and assembly of the said motorcycle erector device 19. The characteristics of the component parts, assemblies and a consumable include their potential for replacement as service items in the event of damage, consumption or excessive wear. Typically, the following component parts, assemblies and a consumable are replaceable as service items, individually or as required: said flexible spheroid enclosure 25, said pressure forming gas-impermeable liner 20, said gas feed fitting 39, said flexible seal 40, said rigid washers 41, said flexible seals 42, said nut 43, said threaded connector fitting with integrated flexible tubing barbed connector 37, said flexible tubing 36, said quick-disconnect fitting with integrated flexible tubing barbed connectors 52, said flexible tubing 35, said pressure reducing gas-metering nipple assembly with integrated flexible tubing barbed connector 24, said tank valve with said threaded stem, said internally threaded gas connection port with internal seal face configuration 29, said manual-operating handle 30, said seal 32, said high-pressure gas storage tank 31 and said high-pressure non-inflammable gas 56.

To deploy the said motorcycle erector device 19, in this preferred embodiment, the operator-driver removes said duffel from the said motorcycle 50 and the said motorcycle erector device 19 from said duffel. The said eye-end of the said retaining link 54 is placed in engagement with the said retention point woven fabric loop 26. The said hook-end of the said retaining link 54 is passed under the said motorcycle 50 lying on its side; passing under the fuel tank and under the engine. The said hook-end of the said retaining link 54 is pushed under the said motorcycle 50 until accessible from the other side of the said motorcycle 50 lying on its side. The said retaining link 54 hook-end is pulled through, is hooked over and engages a structural element of the said motorcycle 50.

The said motorcycle erector device 19 deployed arrangement is complete.

No modifications to the said motorcycle 50 are required to deploy and use said motorcycle erector device 19. The minimal thickness of the non-pressurized said erecting spheroid assembly 21 facilitates placement of the said erecting spheroid assembly 21 between the side of said motorcycle 50 and the said road surface 55.

It should be noted that said side of said motorcycle 50 is formed by a combination of side area projections of various mechanical elements of said 50 motorcycle. For example, but not limited to, the fuel tank, engine, carburetor cover, key switch box and choke actuating knob. In addition, the fuel valve handle, transmission, frame, seat, transmission shifter actuating lever and pedal, brake actuating lever and pedal, foot rest and voids formed by the relative locations of these enumerated, and other diverse elements, define the side of said motorcycle 50. In this preferred embodiment, the said erecting spheroid assembly 21, with low-pressure gas filled said gas-impermeable liner 20, bridges the said voids and accommodates the said projections of various mechanical elements defining said motorcycle 50 side.

To erect the said motorcycle 50 lying on its side, the said motorcycle erector device 19 is deployed, the said tank valve 29 is opened using said manual-operating handle 30. The said high-pressure non-inflammable gas 56 flows through the said pressure reducing gas-metering nipple assembly with integrated flexible tubing barbed connector 24 and delivers metered low-pressure non-inflammable gas to the said flexible tubing gas-transfer assembly 23.

The said metered low-pressure non-inflammable gas passes through the said flexible tubing gas-transfer assembly with integrated flexible tubing barbed connectors 23 to the said erecting spheroid assembly 21. The said pressure forming gas-impermeable liner 20 receives and retains the said low-pressure non-inflammable gas and the said pressure forming gas-impermeable liner 20 is formed to intimate contact with the inside of said flexible spheroid enclosure 25. Equal low-pressure gas exists throughout the components of the said motorcycle erector device 19 that are storing, conveying and using said low-pressure gas.

The said flexible spheroid enclosure 25 translates the said low pressure non-inflammable gas in the said pressure forming gas-impermeable liner 20 into distributed erecting forces acting on the said motorcycle 50 side and distributed reaction forces against the said road surface 55, and erects the said motorcycle 50 to the side-stand angle.

In addition, the large thrust forces—resulting from said distributed erecting forces, said distributed reaction forces and the geometry of the angular relationship of said motorcycle 50 side with said road surface 55—are acting to expel the said erecting spheroid assembly 21 from between the said motorcycle 50 side and said road surface 55.

These resultant thrust forces are reacted by said retaining link 54 connected between said retention point woven fabric loop 26 of said erecting spheroid assembly 21 and said motorcycle 50 structural element. The said retaining link 54 providing the load path for reacting said resultant thrust forces and retention of said erecting spheroid assembly 21 in position.

Cessation of flow of said high-pressure non-flammable gas 56 is marked by the cessation of flow noise. The said motorcycle 50 at the erected side-stand angle is stabilized by the front and rear tires of the said motorcycle 50 and the pressurized said erecting spheroid assembly 21. This stable three-point configuration allows the operator-driver to take in hand the said quick-disconnect fitting 52, mount astride said motorcycle 50 and erect said motorcycle 50 to the normal vertical stopped position, stabilized by the legs and feet of the operator-driver.

The operator-driver de-pressurizes the said erector spheroid assembly 21 by depressing the said locking lever 47 and opening the said quick-disconnect fitting with integrated flexible tubing barbed connectors 52 in the said gas-transfer flexible tubing assembly 23. The said side-stand is deployed and the said motorcycle 50 leaned on the said side-stand.

The operator-driver dismounts and disengages the said hook-end of said retainer link 54 from the said structure of said motorcycle 50. The operator-driver then unscrews the said threaded connector fitting with integrated flexible tubing barbed connector 37 from the said gas feed fitting 39, enabling a greater exhaust rate of the said de-pressurized gas from the said erecting spheroid assembly 21. Said motorcycle erector device 19 is repacked into its said small duffel.

The preceding DETAILED DESCRIPTION of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description but rather by the claims appended hereto.

What is claimed is:

1. A motorcycle erector device for erecting a motorcycle lying on its side comprising:

a flexible spheroid enclosure having a plurality of gores of soft, flexible, woven fabric,
      said flexible spheroid enclosure having a first close-fitting opening, an access and service opening with interlocking tension-load carrying links, and a retention point woven fabric loop;
   a pressure forming gas-impermeable liner comprising a plurality of heat seamed plastic sheet films and a second close-fitting opening,
      said pressure forming gas-impermeable line being located within said flexible spheroid enclosure;
   a gas feed fitting a non-flanged stem-end, a projection portion and an externally threaded end;
      said gas feed fitting is located within both first and second close-fitting openings, said non-flanged stem-end is secured to an interior side of said pressure forming gas-impermeable liner,
      said projection portion is sealed and secured to an exterior of said flexible spheroid enclosure by an assembly nut which is torqued to insure a gas leak-proof assembly and allowing said externally threaded end to be exposed on the outside of said flexible spheroid enclosure,
   a flexible tubing gas-transfer assembly having a first flexible tube with a first end and a second end, a theaded connector fitting with a first barbed connector connected to said first end, and a female locking half of a quick-disconnect fitting with a second barbed connector connected to said second end;
      said flexible tubing gas-transfer assembly having a second flexible tube with a third end and a fourth end, and a male sealing half of a quick-disconnect fitting with a third barbed connector connected to said third end;

said flexible tubing gas-transfer assembly further having a pressure reducing gas-metering nipple assembly with a fourth barbed connector connected to said fourth end, said threaded connector fitting is connected to said externally threaded end of said gas feed fitting;

a high-pressure gas storage tank filled with high-pressure non-flammable gas, said high-pressure gas storage tank having a tank valve with a manual operating handle, said pressure reducing gas-metering nipple assembly is retained in said tank valve by a captive nut, a retaining link formed with an open hook at one end and an eye at the other end, said hook is on a plane perpendicular to the plane of the eye, said hook is adapted to engage said motorcycle, said eye of the retaining link receives and retains said retention point woven fabric loop;

wherein said motorcycle erector device is arranged such that the high-pressure non-flammable gas is allowed to inflate said pressure forming gas-impermeable liner, when said pressure forming gas-impermeable liner is inflated, said flexible spheroid enclosure and said retaining link are adapted to lift said motorcycle to an upright position from a lying on side position.

2. The motorcycle erector device to claim 1 further characterized such that said motorcycle erector device weighs less than 7 pounds and is capable of being packed into a storage container about 15.5 inches long and about 6.5 inches in diameter.

3. The motorcycle erector device of claim 1 further characterized whereby said motorcycle erector device requires no modification of the motorcycle to which the motorcycle erector device is adapted.

* * * * *